Oct. 12, 1965 W. L. SONES 3,211,935
SUBMERGIBLE MOTOR AND ELECTRICAL SYSTEM
Filed Dec. 4, 1962 2 Sheets-Sheet 1

INVENTOR.
WILLIAM L. SONES
BY
ATTORNEY

Oct. 12, 1965  W. L. SONES  3,211,935
SUBMERGIBLE MOTOR AND ELECTRICAL SYSTEM
Filed Dec. 4, 1962  2 Sheets-Sheet 2
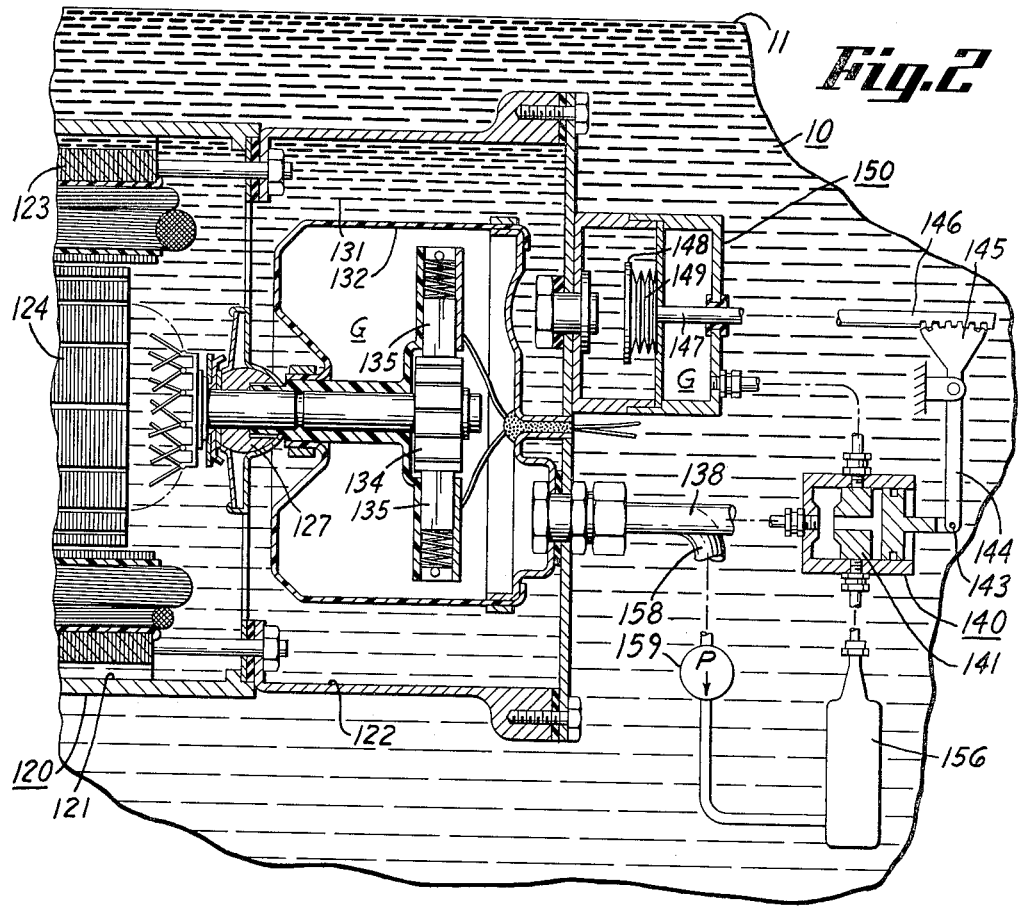
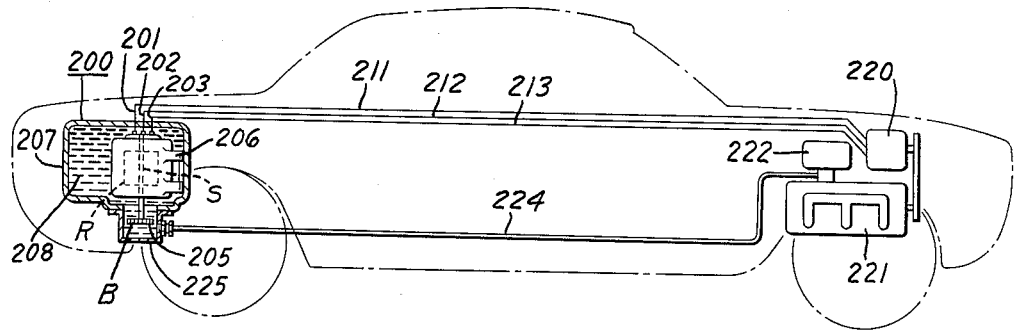
INVENTOR.
WILLIAM L. SONES
BY
Albert H. Reuther
ATTORNEY United States Patent Office 3,211,935
Patented Oct. 12, 1965

3,211,935
SUBMERGIBLE MOTOR AND ELECTRICAL SYSTEM
William L. Sones, Dayton, Ohio, assignor to General Motors Corporation, Detroit, Mich., a corporation of Delaware
Filed Dec. 4, 1962, Ser. No. 242,160
3 Claims. (Cl. 310—87)

This invention relates to electrical equipment workable when submerged and, more particularly, to operation of electrical devices within liquid tanks as well as below surface of a body of liquids such as at sea, in lakes and the like.

An object of this invention is to provide new and improved motor housing arrangement to permit maintenance of gaseous medium surrounding at least a portion thereof for operation as submerged in a fluid medium including a body of liquids such as at sea, in lakes as well as within a storage tank of combustible material.

Another object of this invention is to provide a submergible fluid and electrical system including a motor means having a multiple-chamber housing portion in part of which a stator is mounted and a cooperable armature on a power shaft is journalled to be confined in a lubricating-cooling protective fluid medium such as oil, gasoline and the like while an auxiliary chamber portion thereof has electrical connections to the motor means maintained under a differing fluid gaseous medium such as air, nitrogen as well as inert gases including helium and the like metered thereto from a servo-valve-controlled fluid source by way of a diaphragm-controlled pressure-sensor which determines supply of the gaseous medium regardless of depth of submersion as well as possible escape of gaseous medium around sealing.

Another object of this invention is to provide a vertical motor housing arrangement including a main lower chamber portion filled with a liquid medium such as oil kept sealed therein under urging of a bottom diaphragm which has pressure of external liquid such as sea water thereon in accordance with depth of submersion and which conveys proportionate force in a hydraulic column in which there is a stator and wound armature on a shaft that is bearing journalled, the shaft having a brush and commutator portion carried therewith in a secondary upper chamber portion to which a gaseous medium such as air, nitrogen, or inert gas including helium can be admitted from an outer pressurized source in accordance with operation of a servo-valve means caused to function by a pressure-sensor means sensitive to pressure applied through the hydraulic column that thereby indirectly effects amount of gaseous medium maintained to surround the brush and commutator portion while the oil protects the stator and armature.

A further object of this invention is to provide a motor housing arrangement including a stator and armature on a shaft in a main liquid chamber portion adjacent to a sealed-off secondary gaseous chamber portion into which the shaft extends in a location in which a brush-commutator portion is maintained separated from the liquid chamber portion as well as external matter subject to supply of gaseous medium to the secondary chamber.

Another object of this invention is to provide a storage tank for a combustible liquid such as gasoline to power a vehicle having an electrical alternator system which can power directly a polyphase A.C. motor means with fluid impeller mounted within the combustible liquid inside a storage tank subject to use of fluid medium for cooling in locations at least partially surrounding the motor means.

Further objects and advantages of the present invention will be apparent from the following description, reference being had to the accompanying drawings wherein preferred embodiments of the present invention are clearly shown.

In the drawings:

FIGURE 2 is a fragmentary view of a horizontal motor housing arrangement having features in accordance with the present invention.

FIGURE 3 is a diagrammatic representation of a polyphase motor means and fluid impeller mounted directly within a fuel storage tank subject to use of fluid medium for cooling at least a portion of the motor means.

Figure 1:
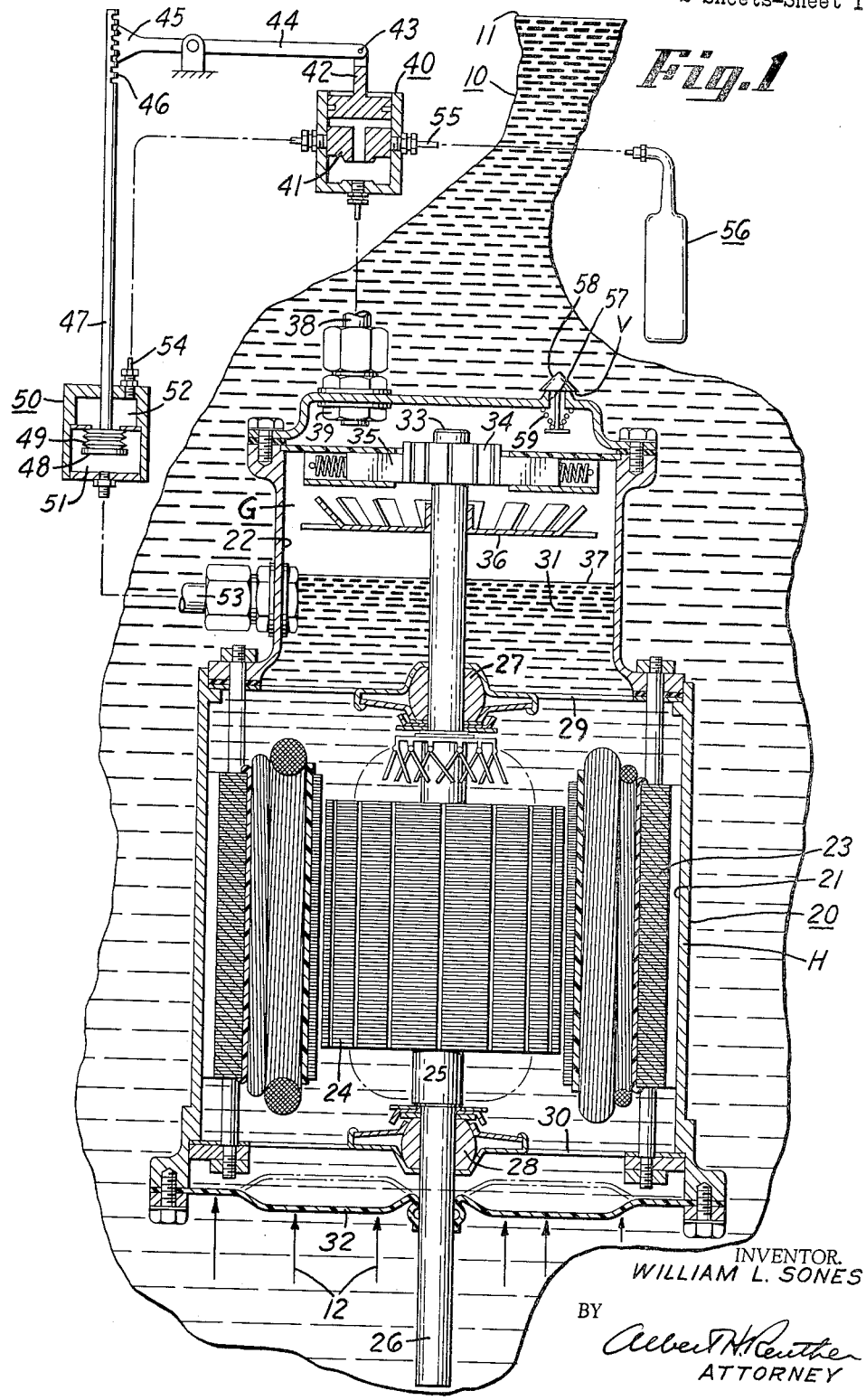
FIGURE 1 illustrates a submergible and electrical system combined with a vertical motor housing arrangement in accordance with the present invention.

At times a need exists to operate a motor means submerged in a body of liquid such as water 10 indicated in FIGURE 1 having an upper surface of liquid level 11. Such a body of liquid can be salty sea water as well as relatively fresh water of a lake and the like which can exert force of pressure as indicated by arrows 12 depending upon the depth at which a motor means generally indicated by numeral 20 is submerged therein. This motor means 20 can include a housing portion H that provides multiple chambers therein including a main or primary chamber 21 as well as a secondary or auxiliary chamber portion 22. A suitable magnetic stator core 23 can be carried inside the housing H particularly in a location radially outwardly from an armature or rotor means 24 carried on a power shaft 25 with an end 26 projecting below a lower periphery of the housing H. This end 26 can serve as a power take-off end for driving a particular load and the shaft 25 is journalled vertically by a pair of upper and lower bearing means 27 and 28, respectively, mounted radially inwardly on spider-like or spoked supports 29 and 30, respectively. The primary chamber portion 21 is filled with a fluid or liquid medium such as oil 31 and there is a diaphragm 32 sealingly attached along an outer periphery thereof to the housing H as well as sealingly engaging a radially outer surface of the shaft 25 adjacent to the end 26 thereof. Force of water pressure as indicated by arrows 12 is transmitted through the diaphragm 32 directly to the oil 31 within the primary chamber portion and, in effect, the stator means 23 and armature 24 which can be suitably encapsulated with an insulating material such as epoxy resin and the like can be surrounded by a hydraulic column of the fluid medium such as oil 31 serving for protection of the stator and armature components against rust and corrosion of water though an upper end 33 of the shaft 25 carries a commutator means 34 having a plurality of segments engageable by brush means 35 at least in diametrically opposite locations along the commutator means 34. An optional radially outwardly extending stabilizer disc means 36 can be carried and secured to the shaft 25 in a location in between the commutator means 34 and the upper bearing means 27. This disc means when provided on the shaft 25 can assure minimizing of any possible splashing of the fluid medium such as oil 31 and also can avoid possible foaming of such fluid medium. The fluid medium such as oil 31 surrounds both bearing means 27 and 28 and extends to an upper level 37 which can optionally be defined by a secondary diaphragm (not shown) or directly by contiguous relationship of a gaseous medium G which can enter the secondary or auxiliary chamber portion 22 by way of an inlet conduit 38 having one end 39 thereof communicating directly with space of the secondary or auxiliary chamber portion 22 and having an opposite end thereof attached to a servo-valve means generally indicated by numeral 40 which can include a shiftable valve spool 41 therein movable, for example, by a push rod 42 pivotally connected at 43 to a lever 44 having a pinion-like end portion 45 with ears that engage a rack 46. This rack and pinion arrangement 45–46 can be designated as an amplifier means in conjunction with the lever 44 shown for purposes of illustration as a mechanical linkage to transfer force in response to movement of a stem 47 having the rack 46 at one end thereof and a disc-like portion 48 at an opposite end thereof peripherally in sealing engagement with a bellows-like portion 49 sealed radially outwardly therefrom to an inner periphery of a pressure-sensor means generally indicated by numeral 50.

The pressure-sensor means 50 is divided by the bellows-like member 49 into a lower chamber 51 and an upper chamber 52. The lower chamber 51 has a conduit 53 connected thereto and communicating with an interior of the housing H of the motor means 20 such that fluid medium such as oil 31 extends above the interconnection of the conduit 53 and housing H and permits some fluid medium such as oil to be located in the chamber portion 51 of the pressure-sensor means 50. Positioning of the bellows and disc 48 carried at a lower end of the stem 47 is determined by transmission of force by the hydraulic column of fluid medium 31 in accordance with water pressure represented by arrows 12 exerting force against an under side of the diaphragm 32. The upper chamber 52 of the pressure-sensor means 50 can communicate by way of a conduit 54 and the servo-valve means 40 with a supply line 55 connected to a source of gaseous medium generally indicated by numeral 56. This source 56 has gas indicated by reference G therein which can be pressurized due to operation of a conventional compressor means (not shown) such that interaction of the gas and fluid medium such as oil between the lower and upper spaces 51 and 52, respectively, in the pressure-sensor will determine movement of the stem 47 for transmission of force to the servo-valve means 40 that, in effect, regulates admission of pressurized gaseous medium G from the source 56 to the secondary or auxiliary chamber portion 22 of the motor housing H. Thus, the commutator means 34 and brushes 35 therewith are maintained in a gas filled chamber at a predetermined equilibrium and balancing of pressures between the pressures between the pressurized gaseous medium G and fluid medium such as oil 31 under force of water pressure represented by arrows 12 applied along an under side of the diaphragm 32.

The gaseous medium G supplied from the source 56 can be compressed air, nitrogen as well as inert gases including helium and the like. However, generally pressurized air will be satisfactory and less expensive particularly if limited leakage should occur anywhere in the system.

It is apparent from the view of FIGURE 1 that the commutator means 34 can function properly within gaseous medium G supplied under pressure to the secondary or auxiliary chamber portion 22. The secondary or auxiliary chamber portion in which the commutator means 34 and brushes 35 are located is provided outboard and to one side of bearing means 27. The housing H for the motor means is preferably water tight in a bell-like configuration kept full of gaseous medium such as air or nitrogen or helium or other preferably inert gases. As water pressure represented by arrows 12 increases such that the fluid column of oil would tend to occupy the auxiliary upper or secondary chamber portion 22, there is a limitation of the level 37 beyond which the liquid is hindered from penetrating the auxiliary or secondary chamber portion 22 due to functioning of the pressure-sensor means 50 to trigger the servo-valve means 40 and to permit supply of further pressurized gas G from the source 56. It is to be understood that the amplification of pressure-sensed signals can be accomplished electrically as well as mechanically as represented by the rack and pinion and lever arrangement. Electrically it would be possible to provide a float-like pressure-sensing means in conjunction with an electrical rheostat or resistance that can supply electrical signals to trigger a semi-conductor means which would serve to amplify electrically limited pressure-sensing electrical signals and to transmit such amplified signals to an electromagnetic plunger or spool of servo-valve means similar to those indicated by numeral 40 in FIGURE 1.

The pressurized gaseous medium G can be inexpensive such as when compressed air is used and such compressed air could be permitted to leak or vent directly into the sea through a vent means V including an opening 57 normally covered by a cap 58 sealingly engaged around the opening 58. The cap 58 can carry a stem and conically shaped spring means 59 extending inwardly into the secondary or auxiliary chamber portion 22 such that inexpensive compressed air can be permitted to escape into the sea or body of water 10 as the motor means 20 is caused to rise toward the surface 11 of the body of water. So long as an inexpensive gaseous medium under pressure is used it is unnecessary to provide a closed gaseous system.

FIGURE 2 illustrates modifications of the submergible fluid and electrical system of FIGURE 1. The source 56 as well as the servo-valve 40 and pressure-sensor means 50 can be similar to those illustrated in FIGURE 1. However, a horizontally disposed motor means 120 is now provided with a main or primary chamber portion 121 filled with hydraulic or fluid medium such as oil which extends into a secondary or auxiliary portion 122 of a housing for the motor means 120. Pressure-sensing means 150 in the embodiment of FIGURE 2 can include a bellows 149 attached to a disc 148 carried on one end of a stem 147 having a rack or gear-like end portion 146 in mesh with an arcuate or curved ear segment 145. A suitable lever or bell crank means 144 can be pivoted about a point 143 and can effect movement of a spool 141 of the servo-valve means 140 so as to control supply of gaseous medium under pressure from source 156. It is to be understood that a stator means 123 and an armature or rotor means 124 is journalled within the motor means 120 by suitable bearings and a diaphragm similar to that designated by reference numeral 32 in FIGURE 1 can be provided by an end of the motor means 120 not shown in the fragmentary view of FIGURE 2. Such a diaphragm again is subject to water pressure thereon for transmission of force through a fluid column of liquid such as oil 131 and a flexible envelope of plastic material 132 can have sealing engagement with a bearing means 127 though filled with gaseous medium G supplied by a conduit 138. However in the system of FIGURE 2 it is contemplated that a more expensive gaseous medium such as nitrogen or inert gas such as helium is to be used and therefore in place of the vent means V of FIGURE 1 there is provided an outlet conduit 158 and a pump means 159 which can return recompressed gaseous mediums to the source 156 in a closed circuitous route. Thus, again a commutator means indicated by reference numeral 134 having brushes 135 electrically engageable thereon can be maintained in a secondary or auxiliary gaseous environment.

In the embodiments of FIGURES 1 and 2 the motor means can have electrical energy supplied to the brushes such as 35 and 135 by suitable electrical connections to permit direct current motor operation in a well-known manner.

FIGURE 3 illustrates another embodiment of submerged polyphase A.C. motor means generally indicated by reference numeral 200 and including the three phase stator winding means having Y-connected stator coils 201, 202 and 203, respectively. These stator winding coils 201, 202 and 203 are indicated diagrammatically in FIGURE 3 and electrical energization thereof can effect rotation of an armature or rotor means R carried by a shaft S suitably journalled in a housing of the motor means 200 and having an impeller means 205 with radially outwardly extending blades B provided thereon. The housing of the motor means 200 can be supported by a yoke-like mounting bracket 206 internally secured to a metal storage tank or fuel container 207 in which a fluid medium such as gasoline or combustible fuel 208 can encircle the motor means 200 for cooling thereof particularly in view of the mounting of the bracket 26 to carry motor means 200 in a location adjacent to a lower wall of the tank or container 207. Polyphase wiring connections 211, 212 and 213 can interconnect the stator coil portions 201, 202 and 203, respectively, directly with an output of an alternator electrical system of a motor vehicle. This alternator electrical system is indicated diagrammatically in the view of FIGURE 3 by a reference numeral 220 and details thereof form no part of the present invention. Accordingly, reference can be made to Patents 2,817,830—Raver; 2,965,765—Bolles et al. as well as 3,037,124—Carlson all belonging to the assignee of the present invention and disclosing alternator electrical systems for motor vehicles and the like. To facilitate understanding of the combination of components in FIGURE 3, there is shown in block-form an internal combustion engine 221 having a fuel mixing means such as a carburetor 222 thereon supplied with liquid medium such as gasoline 208 by way of a conduit or fuel line 224 which interconnects the fuel-air mixing means 222 with the storage tank 207. The conduit 224 can be provided with an enlargement 225 at one end thereof in a location radially outwardly from the blades B of the impeller 205 driven by the motor means 200. Thus, the diagram of FIGURE 3 illustrates the submerged A.C. motor means 200 having an impeller 205 driven thereby and submerged in liquid fuel such as gasoline 208 that serves to cool the motor means 200 and that is pumped by the impeller means directly through the fuel line 224 to the internal combustion engine and fuel-air mixing means thereof. The arrangement of the diagram of FIGURE 3 eliminates use of a separate external fuel pump device previously provided adjacent to the internal combustion engine 221 rather than directly in the fuel storage tank 207 and previously not having direct electrical energization thereof from a three phase electrical alternator system such as 220.

While the embodiments of the present invention as herein disclosed constitute preferred forms, it is to be understood that other forms might be adopted.

What is claimed is as follows:

1. A submergible fluid and electrical system, comprising, a housing portion having a main chamber portion in which both a magnetic stator core wound for electrical energization is mounted and a cooperable armature on a power shaft is journalled, a main-chamber-filling protective fluid medium such as oil, gasoline and the like in which both said wound stator core and armature can operate as both immersed therein, and an auxiliary chamber portion axially in a location at one end of said housing portion and to which a gaseous medium is supplied from a pressurized source having a servo-valve means therewith, said housing portion having a pair of opposite bearing portions also immersed by fluid medium therein to journal an armature shaft that carries a brush-commutator means at an upper end thereof definitely within confines of only said auxiliary chamber portion having said gaseous medium supplied thereto, and a bottom diaphragm of resiliently displaceable material sealingly secured to said housing portion subject to variable pressure in accordance with depth of submersion, said resiliently displaceable diaphragm being provided for transmittal of pressure force to said protective fluid medium as a hydraulic column effective to actuate said servo-valve means for control of supply of further gaseous medium to said auxiliary chamber portion in which said brush-commutator means is kept dry and cool per se.

2. A vertical motor housing arrangement, comprising, a main hydraulically-filled chamber portion in which both a magnetic stator core wound for electrical energization and armature on a journalling shaft are located in fully immersed condition, a bottom diaphragm means secured at one end of said main chamber portion and resiliently displaceable to separate said hydraulically-filled chamber portion from external liquid subject to variation of fluid pressure therebetween, a brush-commutator means carried radially outwardly of said shaft adjacent to an upper end thereof in a location axially remote from said resiliently displaceable diaphragm means, an auxiliary chamber portion axially communicating with said main chamber portion and surrounding said brush commutator means, a hydraulic-pressure-responsive servo-valve means to control supply of gaseous medium to surround said brush-commutator means exclusively for maintaining dryness and coolness thereof in said auxiliary chamber portion, and a bellows-like pressure-sensor means directly responsive to variation in pressure between said gaseous medium and said hydraulically-filled chamber portion regardless of fully immersed condition of said wound stator core and armature, said bellows-like pressure-sensor means acting as an actuator for said servo-valve means and assuring maintenance of a predetermined equilibrium of pressure between said gaseous medium in said auxiliary chamber portion and said hydraulically-filled main chamber portion to assure that said gaseous medium adequately surrounds said brush-commutator means per se at all times.

3. In a submergible fluid and electrical system having a housing portion with a main chamber portion in which both a magnetic stator core wound for energization is mounted and a cooperable armature on a power shaft is journalled as immersed fully within main-chamber-filling protective fluid medium exemplified by oil, gasoline and the like, the specific combination therewith of a diaphragm means secured at one end of said chamber portion and resiliently displaceable to separate the protective fluid medium from external liquid subject to variation of fluid pressure therebetween, a brush-commutator means carried radially outwardly of the shaft adjacent to an end of said main chamber portion in a location axially remote from the end of said diaphragm means, an auxiliary chamber portion surrounding only said brush-commutator means, and a fluid-medium-pressure responsive servo-valve means to control supply of pressurized gaseous medium to surround only said brush-commutator means exclusively for maintenance of dryness and coolness thereof in said auxiliary chamber portion.

References Cited by the Examiner

UNITED STATES PATENTS

| 1,427,974 | 9/22 | Sessions | 310—87 |
|---|---|---|---|
| 2,002,914 | 5/35 | Mendenhall | 310—87 |
| 2,020,513 | 11/35 | Mendenhall | 310—87 |
| 2,177,472 | 10/39 | Barrett. | |
| 2,309,707 | 2/43 | Myers | 310—87 |
| 2,394,860 | 2/46 | Korte | 103—87 |
| 2,510,632 | 6/50 | Hemphill | 103—87 |
| 2,682,229 | 6/54 | Luenberger | 310—87 |
| 2,790,916 | 4/57 | Hinman | 310—87 |
| 2,993,132 | 7/61 | Luenberger | 310—87 |
| 3,041,976 | 7/62 | Maynard | 310—87 |

ORIS L. RADER, *Primary Examiner.*

MILTON O. HIRSHFIELD, *Examiner.*